July 22, 1969   L. A. WEISS   3,457,084
BULGUR PROCESS
Filed Dec. 20, 1965
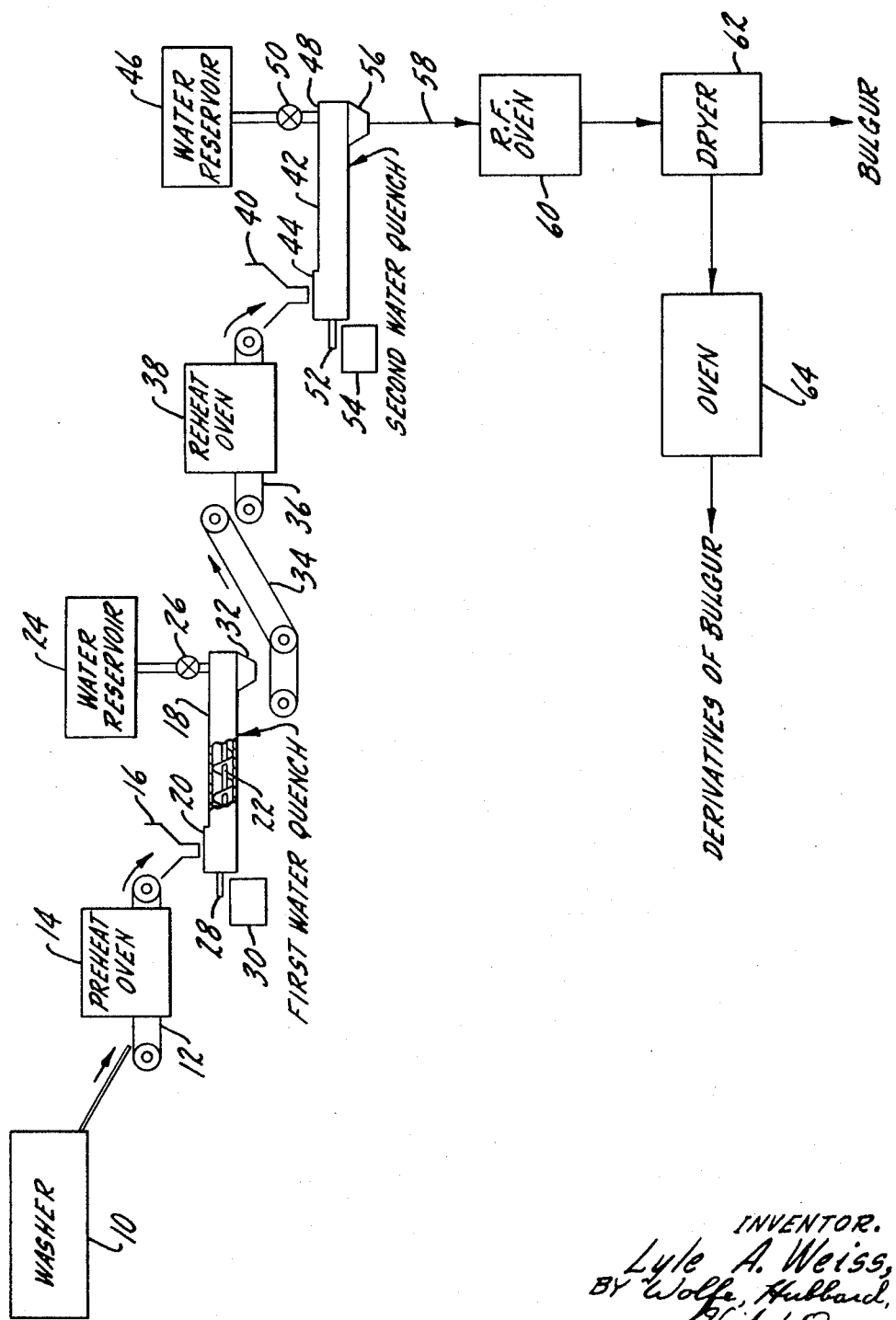
INVENTOR.
Lyle A. Weiss,
BY Wolfe, Hubbard,
Voit & Osann
ATTORNEYS.

United States Patent Office 3,457,084
Patented July 22, 1969

3,457,084
BULGUR PROCESS
Lyle A. Weiss, 4 N. 636 Highway 83,
Bensenville, Ill. 60106
Filed Dec. 20, 1965, Ser. No. 514,897
Int. Cl. A23l 1/10
U.S. Cl. 99—80      6 Claims

ABSTRACT OF THE DISCLOSURE

A method for processing cereal grains, such as wheat to form bulgur, including preheating the cereal grain to 200 to 220° F., raising the moisture content to 30 to 50%, heating the partially water-saturated cereal grain to 150 to 210° F. and raising the moisture content to 80 to 100%. The water-saturated grain may then be gelatinized, preferably by exposing the saturated grain to radio frequency energy for a period of time sufficient to gelatinize the cereal grain.

---

This invention relates to the processing of cereal grains and, more particularly, to the continuous processing of said cereal grains, to form, for example, in the case of wheat, products such as bulgur.

As a product, bulgur or a similar processed wheat is not new. In fact, at least similar products derived from processed wheat have been used for many years by people of the Asiatic and Middle East countries. Bulgur can be used as a substitute for rice and has been traditionally prepared by cooking the wheat in water at moderate temperatures for a substantial period of time and thereafter drying the cooked wheat.

Because of the critical shortage of wheat which has existed for many years in the Asiatic countries, the importance of bulgur as a food stable has continuously risen. To meet this ever-increasing demand much development has been undertaken in an effort to develop a suitable continuous process.

Accordingly, an object of this invention is to provide an improved continuous process for processing cereal grains such as wheat to form products including bulgur and derivatives thereof.

A further object of this invention is to provide, in a process of the type hereinbefore described, an improved method for increasing the moisture content in the cereal grain to the requisite level. In this connection, a related object of this invention is to provide an improved method for causing moisture in the cereal grain to assume an even distribution therein.

A still further object of this invention is to reduce the time necessary for gelatinizing a water-saturated cereal grain. A related object is to provide a method of gelatinizing a water-saturated cereal grain which allows uniform gelatinization without any need for externally supplying moisture to carry out the gelatinizing.

Other objects and advantages of this invention will become apparent upon reading the following detailed description and upon reference to the drawing in which:

The sole figure schematically depicts apparatus suitable for carrying out the process of this invention.

While the invention will be described in connection with certain preferred embodiments, it is to be understood that this invention is not intended to be limited to the particular embodiments disclosed, but on the contrary, it is intended to cover the various modifications and equivalent arrangements included within the spirit and scope of the invention as defined in the appended claims. Thus, for example, while the description of the process which follows hereinafter is directed to wheat, it should be appreciated that the process is applicable to all cereal grains.

As a required preliminary step in this process, as in all conventional processes for producing bulgur from wheat, it is necessary to first thoroughly clean the wheat grains by such means as utilizing a separator to remove foreign material and grading the wheat to kernel size. The wheat must then be passed through a washing step such, for example, as contacting with a water spray for a short period of time to remove dirt particles and residual chaff.

It is then necessary to increase the moisture content from the initial level of the raw wheat of about 10% to a level in the range of from about 80 to about 100%, based upon the dry weight of the wheat grain. Heretofore, this was accomplished by first spraying the grain, allowing it to fall by gravity through a series of settling tanks and thereafter steaming to further increase the moisture content. Because this sequence of operations required a period of about 12 hours, further developments continued. Another prior art method comprised submerging the grain in an amount of water which was excess of that which could be absorbed by the grain, moving the grain through the water and progressively increasing the temperature of the water to predetermined ranges as the grain sequentially passes through these predetermined ranges. The total elapsed time for this sequence is about 90 minutes.

In accordance with one aspect of this invention, the moisture in the wheat grain is increased by first preheating the grain in an oven to raise the temperature thereof to a temperature in the range of from about 200 to about 220° F. The preheated wheat grain is then introduced into a first water quench wherein the moisture content of wheat grain is raised to an amount in the range of from about 30 to about 50%.

Both the temperature to which the wheat grain is preheated and the extent of increase in the moisture content must be maintained within the limits hereinbefore described. As the temperature of preheating decreases below about 200° F., the efficiency of the first water quench is correspondingly decreased because the extent to which the grain structure is expanded becomes less; this decrease hampers the introduction of the water into the grain structure. Heating the grain to a temperature above about 220° F. introduces the possibility that the dry heat at such a temperature would result in dextrinizing the starch which is present in the wheat grain. Moreover, such temperatures present the possibility that when the grain is introduced into the first water quench, the efficiency will be decreased due to the formation of an excess number of water vapor bubbles on the surface of the grain which will hinder the entry of water into the grain structure.

With regard to the increase in the moisture content, a content of below about 30% is not significant enough to enhance expansion of the grain structure upon being reheated, as will be detailed hereinafter. On the other hand, to increase the moisture content to a level above about 50% requires too long a period of time for practical operation.

The cold water which comprises the first water quench, and to which the preheated cereal grain flows countercurrently, need not be specially cooled. However, even though it is adequate to use water at the temperature which it has when it is removed from the particular water source, it is preferred to have the water temperature at the water inlet such that the water reaching the cereal grain inlet has a temperature which is approximately equivalent or only slightly less than that of the preheated grain which is entering the first water quench. In this manner, many advantages are realized. Initially, this avoids a large temperature differential which could result in a rupturing of the grain structure as well as increasing the necessary time for the water quench. Also, this allows the grain structure, both interior and exterior to cool at quite similar rates.

To increase the moisture content to the requisite level for gelatinization the water-laden wheat grain is introduced into a reheat oven wherein the grain is heated to a temperature in the range of from about 150 to about 210° F. Temperatures below about 150° do not allow sufficient expansion on the part of the grain structure to adequately facilitate entry of the moisture whereas temperatures above about 220° may result in rupturing the grain structure because of the possibility of boiling of the water.

The reheated grain is then introduced into a second water quench. In this second water quench, the moisture content of the grain is increased to a level in the range of from about 80% to about 100% so that, when the water-saturated wheat grain is cooked, as will be detailed hereinafter, gelatinization will take place as opposed to the undesirable step of dextrinizing. The second water quench is identical to the first water quench with water at ambient temperatures flowing countercurrently to the reheated, water-laden wheat grain.

It is theorized that, upon reheating, the entrained air and water vapor within the partially saturated wheat grain is expanded and this correspondingly exerts pressure on the grain structure which entrains this water vapor and air and also allows some of the water vapor and air to escape, depending upon the pressure build-up within the cell structure. When this reheated wheat grain is immersed into the second water quench, the resulting contraction and reduction in volume draws water into the voids of the wheat grain as though they were being pumped into the grain. The greater exterior atmospheric pressure forces the water to fill the voids within the wheat grains which were left by the vacuum produced by the cooling of the grain. This same theory applies to the preheating and first water quench, but the effect is not so pronounced due to the relatively low water content of the grain at that point.

If it is desired, additional reheating and water quench steps can be performed. It has, however, been found that only one reheating step is generally necessary. The total time for increasing the moisture content from the initial content to the desired level of from about 80 to about 100% will, for most purposes, be only about one hour.

To form bulgur it has then been necessary to gelatinize the moisture-laden wheat grain by a "cooking" step. Heretofore, this has been carried out by conveying the wheat through a heated moist atmosphere. For example, the wheat can be conveyed by gravity through a pressure steamer wherein the steaming treatment is carried out under pressure of up to about 30 pounds per square inch.

Instead of utilizing high pressures, the prior art has carried out the step of gelatinizing the moistened starch in the wheat grains by employing a cooker wherein the wheat grains pass through the length of the cooker on a continuous mesh belt and are subjected to steam at atmospheric pressure. This latter method requires, due to the lower pressures, a longer time to accomplish the gelatinizing than the other prior art method. The use of the mesh belt allows the water formed by the condensation of the steam to drain away from the wheat grain so that rupture of the grain does not result.

In accordance with another aspect of this invention, the step of cooking the wheat grain to gelatinize the moistened starch within the grain cell without rupture or breaking down of the cellulose shell is accomplished by placing the water-saturated wheat grain in an area sealed off from the remainder of the atmosphere and thereafter exposing the wheat grain to radio frequency energy for a period of time sufficient to gelatinize the moistened starch.

With respect to this step, it is hypothesized that the use of radio frequency energy provides a two-fold advantage. Initially, it is thought that the wheat grain in itself is a small sealed vessel and the entrance or the agitation of the shell structure through the absorption of the radio frequency energy builds up a pressure within the grain structure, and in a sense, is a pressure cooker within itself. Also, the sealed off area is a second pressure vessel in the system because the air and the surface moisture within this area is heated and allowed to escape only under the build up of pressure within the area. This insures a uniform gelatinization throughout the wheat grain.

After the completion of the cooking step, the gelatinized wheat grain is then subjected to drying wherein the excess water is removed and the moisture content reduced to approximately the amount that was initially present.

At this point, the bulgur can be packaged or additional conventional steps such as cracking, partial debranning, or grinding can be undertaken to further process the bulgur.

In accordance with a still further aspect of this invention, the bulgur can, after removal from the enclosed area wherein the gelatinization was carried out, again be exposed to radio frequency energy for a period of time sufficient to dextrinize, caramelize or carbonize, depending upon the particular product desired. Normally, the bulgur will, as the length of heating increases, sequentially be dextrinized, then caramelized and finally, carbonized.

Uses of these bulgur derivatives are many. For examples, the dextrinized and/or caramelized derivatives can be used as a dusting flour or as a flour utilized in the making of gravy or as a component in brews, malts and beer. Products for the above-identified uses may suitably contain minor amounts of the derivative resulting from the step of carbonizing. For the absorption of undesirable flavors, the carbonizing percentage should be increased. Lastly, the carbonized bulgur derivatives can be used in blending to produce a beverage similar to coffee.

Because the starch content in these derivatives has been gelatinized, their use in products as hereinbefore outlined will not result in the objectionable gummy starch residue which has previously been associated with the use of cereal grains having a significant starch content.

Referring to the sole figure, there is schematically shown apparatus suitable for carrying out the process of this invention. As was hereinbefore described, it is first necessary to thoroughly clean the wheat grain by such steps as utilizing a separator to remove foreign material and grading the wheat kernel size. Next, as is shown, the wheat is passed through the washer 10 wherein it is contacted with a water spray for a short period of time to remove dirt particles and residual chaff.

It is then necessary to increase the moisture content from the equilibrium level of the raw grain of about 10% to a level in the range of from about 30 to about 50%. This is accomplished by placing the washed raw wheat grain onto a conveyor 12 which conducts the wheat grain into the preheat oven 14, which oven preferably utilizes conventional radio frequency energy, wherein the temperature of the wheat grains is raised to a temperature in the range of from about 200 to about 220° F. The preheated wheat grain is then passed by gravity through a funnel 16 and into a first water quench 18 through an inlet 20. The now submerged wheat grain is transported through the first water quench 18 by a screw conveyor 22. Water at ambient temperatures from a reservoir 24 flows into the first water quench 18 and is controlled by a valve 26. An overflow drain line 28 allows the excess water to drain into a drain trap 30.

The partially water-saturated wheat grain emerges from the first water quench 18 through an exit port 32 and is then deposited onto a conveyor 34.

In order to raise the water content of the wheat grains to the desired level of from about 80 to about 100%, the partially water-saturated wheat grain is transferred to a conveyor 36 and then enters a reheat oven 38, again preferably using radio frequency energy, wherein the temperature of the grain is raised to a level of from about 150° to about 210° F., depending upon the density of the grain and the amount of moisture which is desired in the water-saturated grain. The reheated, partially saturated wheat grain emerges from the reheat oven 38 and passes through a funnel 40 into a second water quench 42 through an inlet 44.

In the place of a separate oven for reheating the grain, the preheat oven 14 can be used for both steps. In such an instance, the residence time of the grain could, of course, be maintained at the level necessary to raise the temperature of the grain to the requisite level.

The second water quench 42 is identical in all respects to the first water quench 18. The water at ambient temperature is maintained in a reservoir 46 and enters the second water quench through a port 48. The rate of introduction of the water is controlled by a valve 50. Overflow drain line 52 allows the excess water to drain into a drain trap 54. The water-saturated wheat grain is discharged through an exit port 56 and is deposited onto a mesh conveyor 58 for delivery to the cooking step.

To gelatinize the moistened starch within the grain cell without rupture or breaking down of the cellulose shell, an air lock rotating drum conveyor is utilized. The mesh conveyor 58 deposits the water-saturated wheat grain into the air lock feeder of the drum. The air lock rotating drum conveyor, which is physically located within an oven 60 now presents an enclosed area in which the moisture from the saturated wheat grain cannot be lost to the atmosphere within the oven 60 except by venting when a predetermined pressure build up within the drum conveyor has been reached. In this step, the oven 60 utilizes radio frequency energy and the saturated wheat grains are exposed to such energy for a period of time sufficient to completely gelatinize the moistened starch.

At this point, the gelatinized wheat grain is then removed from the air lock discharge of the rotating drum conveyor and transported to a drier 62 wherein the excess water is removed and the moisture content reduced to approximately the amount that was initially present. The bulgur product can then be packaged or additional processing steps such as cracking, partial debranning or grinding can be undertaken.

If it is desired to form derivatives of bulgur, the dry bulgur emerging from the drier 62 is transported to an additional oven 64 wherein the bulgur is exposed to the heat for a time sufficient to either dextrinize, caramelize or carbonize, depending upon the particular derivative desired. Instead of utilizing separate ovens, it should be appreciated that the steps of dextrinizing, caramelizing or carbonizing could take place in the drier 62 by simply increasing the residence time.

Thus, the invention provides an improved and efficient continuous method for processing cereal grains to form, in the case of wheat, products such as bulgur.

The novel method for increasing the moisture content from the initial level of wheat to the range necessary for the gelatinizing step requires, for its completion, a space of about only one hour. In addition to being a decrease in time of about 33⅓%, this novel method allows the water content to be evenly distributed within the grain structure.

Moreover, in contradistinction to the conventional practice of gelatinizing by supplying an independent source of heat and moisture, this invention accomplishes this step by utilizing only the application of conventional radio frequency energy, such as is supplied by numerous, commercially available ovens. In addition to the obvious advantage of decreasing the time necessary for carrying out this step, the discovery that the application of radio frequency energy alone could gelatinize the moistened starch in cereal grains has also resulted in greater uniformity in the resultant gelatinizing.

I claim as my invention:

1. A method for processing cereal grain which comprises preheating said cereal grain to a temperature in the range of from about 200 to about 220° F., submerging the preheated cereal grain in and moving said preheated cereal grain countercurrently to a stream of water for a period sufficient to raise the moisture content to a level in the range of from about 30 to about 50%, based upon the dry weight of said cereal grain, removing the partially saturated cereal grain from the stream, heating the partially saturated cereal grain to a temperature in the range of from about 150 to about 210° F., submerging the heated, partially saturated cereal grain in and moving said heated cereal grain countercurrently to a stream of water for a period sufficient to raise the moisture content to a level in the range of from about 80 to about 100% and removing the saturated cereal grain from said stream.

2. The process of claim 1 which includes gelatinizing the saturated cereal grain and thereafter drying the gelatinized cereal grain to reduce the moisture content thereof to a level below about 10%.

3. The method of processing cereal grain of claim 2 wherein said gelatinizing is carried out by exposing said water-saturated cereal grain to radio frequency energy for a period of time sufficient to gelatinize said water-saturated cereal grain.

4. The method of claim 2 wherein the dried gelatinized cereal grain is thereafter dextrinized.

5. The method of claim 2 wherein the dried gelatinized cereal grain is thereafter substantially caramelized.

6. The method of claim 2 wherein the dried gelatinized cereal grain is thereafter substantially carbonized.

References Cited

UNITED STATES PATENTS

| 2,808,333 | 10/1957 | Mickus et al. | 99—80 |
| 2,884,327 | 4/1959 | Robbins | 99—80 |
| 3,132,948 | 5/1964 | Smith et al. | 99—80 |

RAYMOND N. JONES, Primary Examiner

J. R. HOFFMAN, Assistant Examiner